Dec. 31, 1940.  H. E. SOREF  2,227,283

LOADING RAMP FOR HAND TRUCKS

Filed March 19, 1940

Inventor
Harry E. Soref
by [signature]
his Attorneys

Witness.
A. G. McKnight.

Patented Dec. 31, 1940

2,227,283

UNITED STATES PATENT OFFICE 2,227,283

LOADING RAMP FOR HAND TRUCKS

Harry E. Soref, Milwaukee, Wis., assignor to Master Lock Company, Milwaukee, Wis., a corporation of Wisconsin Application March 19, 1940, Serial No. 324,819

8 Claims. (Cl. 214—38)

This invention relates to a portable ramp intended for use with hand trucks, particularly in connection with standardized conditions, as, for example, in the loading of such trucks in a factory at certain regular stations, and with certain standardized forms of loads. One object of the invention is to simplify and facilitate the loading or unloading of a hand truck by supporting it at a convenient elevation. Another object is to provide a support for a hand truck which will hold it stationary during the process of loading or unloading; and a further object is to reduce the fatigue incident to lifting loads onto or off from such a truck by providing auxiliary supporting means to elevate the truck platform to the most efficient level. The invention consists in certain features and elements of construction in combination, as herein shown and described and as indicated by the claims.

Figure 2:
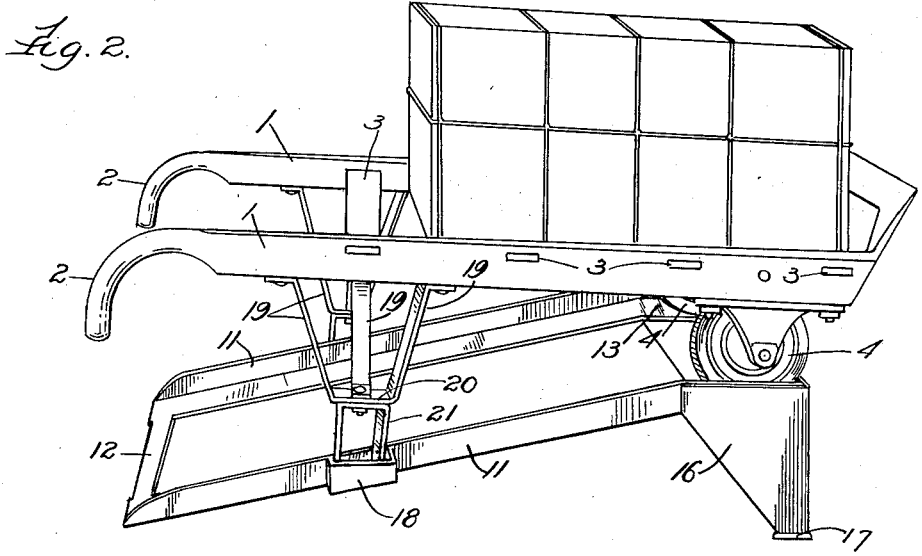
Figure 2 is a side view in perspective, showing the ramp with a hand truck supported thereon.
Figure 3:
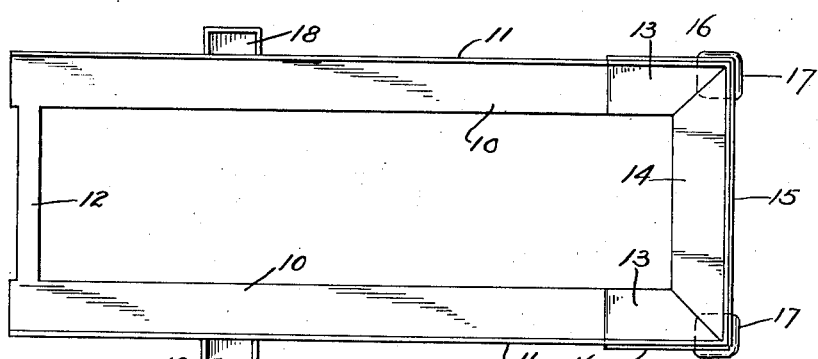
Figure 3 is a plan view of the ramp.

A two-wheeled hand truck, as commonly constructed, includes a load-supporting platform comprising side rails 1, 1, terminating in handles 2, 2, as seen in Figure 2, and connected by cross-members 3. The wheels 4 are usually so small that the platform thus formed by the rails 1 and cross-bars 3 is supported quite close to the floor or ground level, so that even when it is provided with auxiliary legs on which the platform may rest at a level position, it requires a considerable amount of stooping and bending to load or unload boxes or packages from the truck. The present invention provides a portable inclined ramp which may be placed wherever convenient adjacent the loading station, such as a platform, bench or table, so that the hand truck may be run up onto the ramp in preparation for the loading or unloading process, and will be supported at a proper level to permit of efficient handling of its load.

Figure 1:
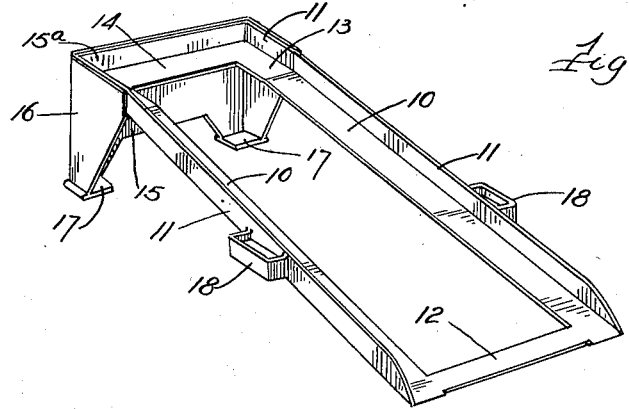
Figure 1 is a perspective view of a portable ramp embodying this invention.

Figure 1 shows the ramp as consisting of side rails 10, 10 having lateral guard flanges 11, 11 and connected at their lower ends by a cross-bar 12. The rails are supported in inclined position and include terminal portions 13, 13, which are substantially level, and may be connected by a cross-member 14. The terminal sections 13 and cross-member 14 are secured to a three-sided support of sheet metal comprising an end wall 15 and side walls 16, tapered downwardly and integrally joined, as by casting or welding, to foot plates 17. Thus, when the truck wheels 4 are rolled up the inclined rails 10 and onto the level portions 13, the elevation of the truck platform from the floor is increased by the height at which the track sections 13 are carried by the supporting structure of the ramp.

To hold the truck in this position the ramp includes pockets 18 secured to the outer faces of the guard flanges 11 at opposite sides of the ramp, and positioned to receive the supporting legs of the truck when its wheels 4 rest on the level portions 13. As shown, the legs consist of converging brace members 19 connected to a foot plate 20, the latter being disposed at about the same distance below the truck platform as the lower side of the wheel 4. Extensions 21 are bolted to the foot plates 20 to increase the length of the legs when the truck is used in conjunction with the portable ramp embodying this invention, or, in any case, if the truck is not required to stand with its platform level when supported directly on the floor by its wheels and the legs. It may be understood that if it were desirable to have the legs shorter, as, for example, to make them terminate at the plates 20, the pockets 18 could be secured at more elevated positions in relation to the inclined rails 10, 10 so as to carry the truck platform at a level position; but, in general, it is more convenient to have the pockets disposed within the vertical height of the guard rails 11, 11, as shown in the drawing.

Thus, when the truck is rolled up along the inclined rails 10, 10 its wheels 4 are arrested by the upper portion 15ª of the end wall 15 acting as a stop flange, and with the wheels at this position the legs of the truck will register with the pockets 18 so that when they are lowered into the pockets the truck will be held against longitudinal movement by the pockets 18 and against lateral movement by the portions of the flanges 11 adjacent to level sections 13 of the rails 10, and just inside the side plates 16 of the support. At this position the truck will stand safely until loaded or unloaded, and may then be readily disengaged from the pockets 18 merely by lifting up on the handles 2 and then drawing it down the rails 10.

It will be readily appreciated that with this comparatively light and portable auxiliary support the handling of material in factories and warehouses by means of hand trucks may be greatly facilitated. The construction of the portable ramp, as shown, is quite simple, involving merely the welding together of angle sections and easily cut parts of sheet metal, so that its cost may be comparatively low. And wherever the trucks already in use are constructed with relatively short legs, terminating in foot plates, as seen in Figure 2, the extensions 21 may be added very easily to adapt the trucks to use with ramps made in accordance with this invention. While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. A ramp for a hand truck comprising an inclined runway for the wheels of the truck and rests for the legs of the truck laterally adjacent said inclined runway, said rests being disposed at an elevation for supporting the platform of the truck in a substantially level position.

2. A ramp for a hand truck comprising an elevated section for the wheels of the truck, an inclined approach leading to said section and rests for the legs of the truck laterally adjacent said inclined approach and spaced from the elevated section, said rests being disposed at an elevation for supporting the platform of the truck in a substantially level position.

3. A ramp for a hand truck comprising an elevated section for the wheels of the truck, an inclined approach leading to said section and upwardly open pockets for the legs of the truck laterally adjacent said inclined approach and spaced from the elevated section, said pockets being disposed at an elevation for supporting the platform of the truck in a substantially level position and serving also to check the truck against longitudinal movement on the ramp.

4. A ramp for a hand truck comprising an inclined runway for the wheels of the truck, and upwardly open pockets secured laterally adjacent said inclined runway to receive the legs of the truck, said pockets being disposed at an elevation for supporting the platform of the truck in substantially level position and serving also to prevent longitudinal movement of the truck on the ramp.

5. A ramp for a hand truck comprising a pair of rails spaced apart to receive the wheels of the truck and provided with lateral guard flanges, said rails including elevated terminal sections and inclined approaches leading thereto, and rests for the legs of the truck secured to the outer faces of said guard flanges respectively and spaced longitudinally from the elevated terminals, said rests being disposed at an elevation for supporting the platform of the truck in a substantially level position.

6. In the combination defined in claim 5, a support for the elevated ends of the rails comprising an end wall and side walls, the side walls being secured to the guard flanges of said rails and the end wall projecting above the wheel-supporting surfaces of the rails to serve as a stop, limiting movement of the wheels on the ramp in one direction.

7. In combination with a hand truck having a load-carrying platform with wheels adjacent one end and legs spaced longitudinally from said wheels, the legs extending farther below the platform than the wheels, a ramp for supporting said truck in elevated position comprising an elevated section for the wheels of the truck, an inclined approach leading to said section, and rests for the legs of the truck laterally adjacent said inclined approach and spaced longitudinally from the elevated section, said rests being disposed at a level below that of the elevated section for supporting the platform of the truck in a substantially level position.

8. In combination with a hand truck having a load-carrying platform with wheels adjacent one end and legs spaced longitudinally from said wheels, the legs extending farther below the platform than the wheels, a ramp for supporting said truck in elevated position comprising an elevated section for the wheels of the truck, an inclined approach leading to said section, and pockets for the legs of the truck laterally adjacent said inclined approach and spaced longitudinally from the elevated section for supporting the platform of the truck in a substantially level position and checking the truck against longitudinal movement by engagement of the legs in said pockets.

HARRY E. SOREF.